Dec. 16, 1969  G. WENDEL ET AL  3,483,674
EVAPORATION COOLER
Filed April 22, 1968  3 Sheets-Sheet 3
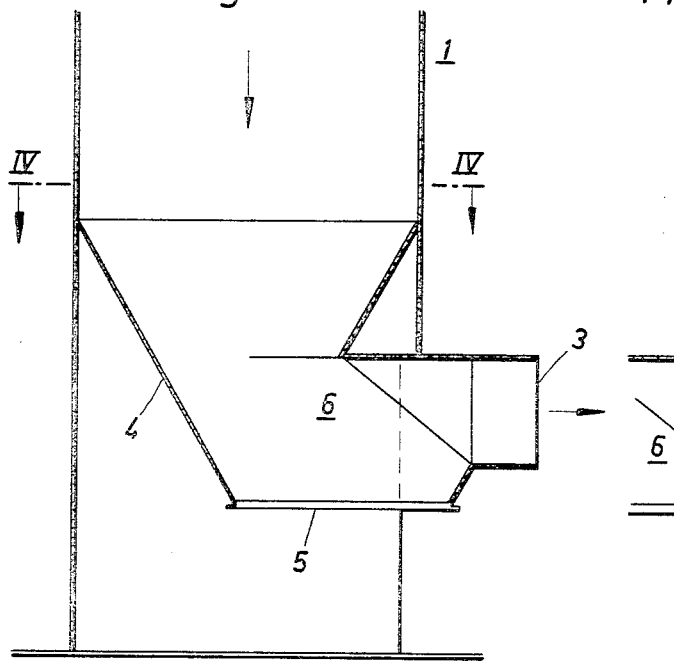
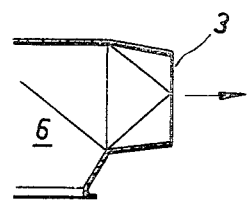
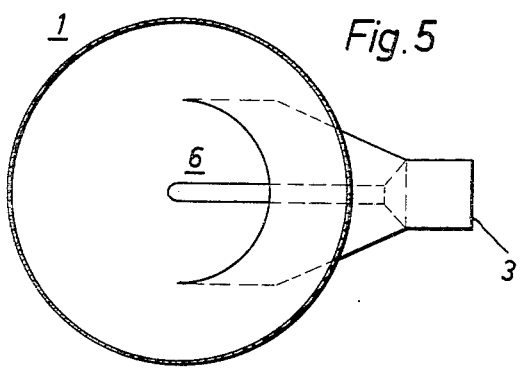
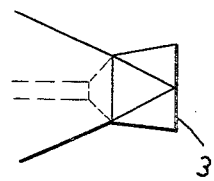
Inventors:
GÜNTER WENDEL
FRITZ ENDERS
BY Stephens, Huettig + O'Connell
ATTORNEYS

United States Patent Office 3,483,674
Patented Dec. 16, 1969

1

3,483,674
EVAPORATION COOLER
Günter Wendel and Fritz Enders, Frankfurt am Main, Germany, assignors to Metallgesellschaft Aktiengesellschaft, Frankfurt am Main, Germany
Filed Apr. 22, 1968, Ser. No. 722,995
Claims priority, application Germany, Apr. 29, 1967, M 73,800
Int. Cl. B01d 53/10
U.S. Cl. 55—267                        1 Claim

ABSTRACT OF THE DISCLOSURE

A hopper is positioned in the lower end of a vertical evaporation cooler and has a dust discharge opening in its bottom. A trough-like channel above the discharge opening and in the hopper leads directly into a gas outlet duct connection. This avoids dead gas spaces above the evaporator cooler bottom.

---

An evaporation cooler is a device arranged ahead of an electrostatic dust collector which cools the hot gases emanating, e.g., from a furnace to a temperature advantageous for the operation of the electrostatic dust collector. Evaporation coolers in combination with electrostatic dust collectors are used in numerous lines of industry to keep the atmosphere clean. Generally, the electrostatic dust collectors located following after the evaporation coolers are dry working dust collectors, i.e. the gases to be cleaned do not contain free moisture. It has to be absolutely avoided that water droplets are carried into the dry working dust collector. That means that, in the evaporation cooler, the cooling water has to be evaporated completely so that the dust falling out into the hopper below the evaporation cooler is dry. This is especially advantageous as in most cases this dust is returned to the furnace.

In this connection, the flow direction is of great importance. In this type of evaporation cooler, the flow of gas and cooling liquid, e.g., water, is unidirectional and downward.

The gas outlet connections for the evaporation cooler is positioned at the cylindrical part of the cooler above the cooler hopper as disclosed in the washing cooler, British Patent No. 939,431. According to this arrangement, there is a dead space in the cooler hopper where the gas is stagnant, thus causing condensation on the hopper walls due to excessive cooling. This condensation causes incrustations on the walls and dust bridging at the dust outlet of the hopper which means interruption of the continuous dust discharge. The necessary cleaning of the cooler hopper requires interruption of operation and production losses become unavoidable.

There are known wet working dust collectors in which the gas outlet connection is located at the lowermost part of the dust collector and cooler a little above the hopper as disclosed in the German registered Design No. 1,822,524. But such arrangements do not avoid the dead space in the lower part of the hopper in which the gas is stagnant.

To eliminate the above disadvantages, this invention produces an evaporation cooler for the cooling of hot gases which are to be cleaned in a subsequent electrostatic dry working dust collector with the gas inlet connection at the upper end of the cooler, a vertical gas passage and with the gas outlet connection at the lower end of the cooler, a dust hopper positioned at the lower end of the cooler, in which the gas outlet located at the lowermost part of the cooler hopper above the dust discharge opening has the shape of a horizontal or upwardly incline duct connection.

2

According to a further feature of the invention, the lower hopper walls in combination with a contraction in the walls above the dust discharge opening form a trough-like channel which continues into a round or rectangular duct connection.

Due to the arrangement according to this invention of having the gas outlet of the evaporation cooler at the lowermost part of the cooler hopper, a permanent circulation of fairly hot gases and thereby heating of the hopper is guaranteed, and thus condensation, incrustations and dust bridging are avoided. Compared to the conventional arrangements this present solution is therefore a surprising inventive step which is of great importance for the reliable operation of the evaporation cooler. In addition to this a further advantage is the following: the construction height of the cylindrical part of the evaporation cooler between the top edges of the gas outlet connection and the cooler hopper which was so far unused will now be added to the required active volume of the evaporation cooler which results in a marked decrease of the initial cost. For a given volume of the evaporation cooler, the construction height of a cooler according to this invention will be lower than that of conventional designs. Thereby an advantageous shortening of the gas duct between the evaporation cooler and the electrostatic dust collector is made possible because a central gas inlet connection at the electrostatic dust collector is now chosen and not any more a gas inlet connection from above.

The means by which the objects of this invention are obtained are described more fully with reference to the accompanying drawings in which:

FIGURE 3a is a plan view of FIGURE 2a;

FIGURE 4 is a modification of FIGURE 2 showing a horizontal duct connection;

FIGURE 4a is a modification of FIGURE 2 showing a round duct connection;

FIGURE 5 is a plan view of FIGURE 4; and

FIGURE 5a is a plan view of FIGURE 4a.

Figure 1:
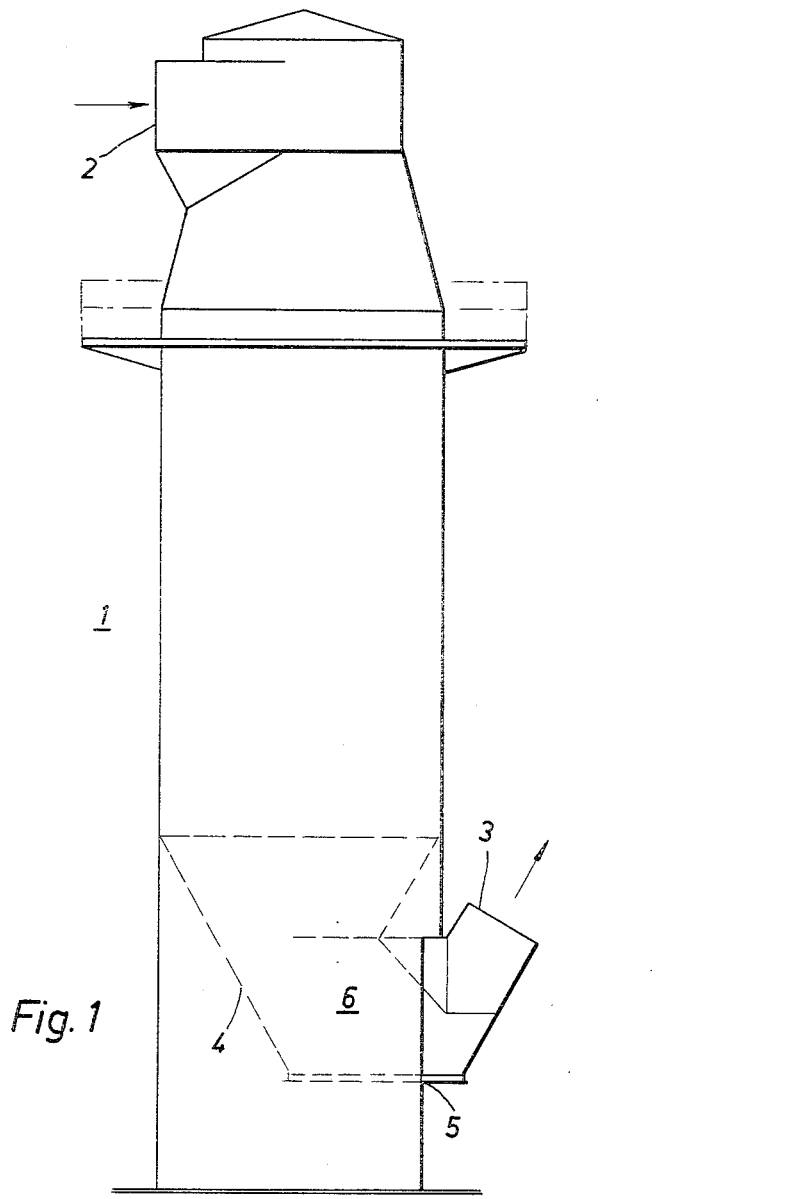
FIGURE 1 is a side elevational view of the evaporation cooler having an upwardly inclined duct connection.
Figure 2:
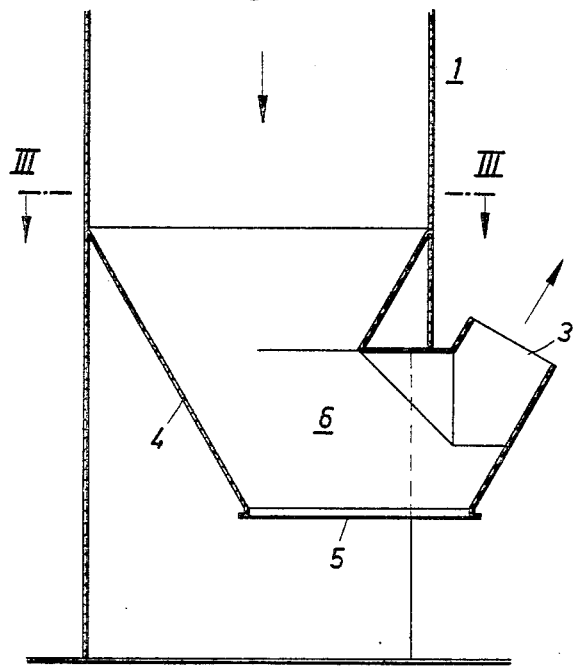
FIGURE 2 is a cross-sectional view of the lower part of the cooler of FIGURE 1 with a rectangular duct connection.
Figure 2A:
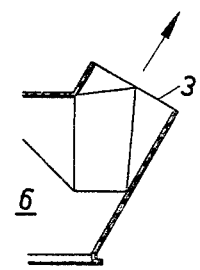
FIGURE 2a is a modification of FIGURE 2 showing a round duct connection.
Figure 3:
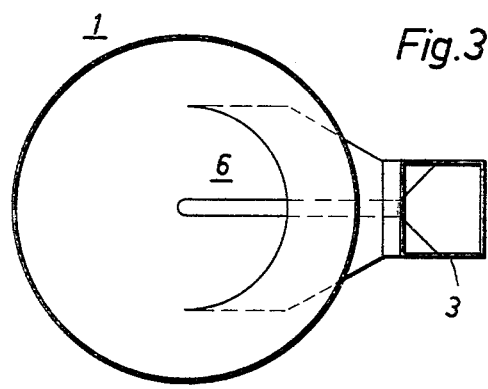
FIGURE 3 is a cross-sectional view taken on the line III—III, FIGURE 2.
Figure 3A:
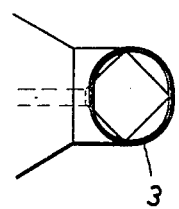

The gas to be cooled enters the vertical housing for the evaporation cooler 1 through raw gas inlet 2 and leaves the evaporation cooler through gas outlet 3. The lower part of the evaporation cooler 1 forms a hopper 4 above the elongated slot dust discharge opening 5 in the substantially flat bottom of the trough-like channel 6 which leads into the gas outlet duct connection 3. As the channel construction is sufficiently sturdy and rigid in itself, additional reinforcements are not necessary. Contrary to the conventionally tapered hoppers, the trough-like hopper below the cooler guarantees a continuous discharge of the dust.

Having now described the means by which the objects of this invention are obtained, we claim:

1. Evaporation cooler for cooling hot gases which are to be cleaned in a following dry working electrostatic dust collector comprising a vertical housing, a raw gas inlet in the top of said housing, a vertical gas passage in said housing, a hopper in the lower portion of said housing, an elongated slot dust discharge opening in the substantially flat bottom of said hopper, walls for said hopper, a contraction in said walls above said discharge opening which with the lower portion of said walls forms a trough-like channel, and a gas outlet duct connection joined to the lowermost part of said hopper above said dust discharge opening and communicating with said trough-like channel and being from horizontal to upwardly inclined.

References Cited

UNITED STATES PATENTS

| | | | |
|---|---|---|---|
| 1,300,605 | 4/1919 | Griffin | 261—117 |
| 1,734,677 | 11/1929 | Kreisinger | 261—116 X |
| 2,983,332 | 5/1961 | Vicard | 55—5 |
| 3,167,413 | 1/1965 | Kickens, et al. | 55—225 |

FOREIGN PATENTS

| | | |
|---|---|---|
| 1,204,011 | 8/1959 | France. |
| 856,244 | 12/1960 | Great Britain. |
| 1,002,769 | 8/1965 | Great Britain. |
| 1,009,653 | 11/1965 | Great Britain. |
| 1,017,715 | 1/1966 | Great Britain. |

OTHER REFERENCES

Wachter et al.: German printed application No. 1,085,854, printed July 28, 1960.

HARRY B. THORNTON, Primary Examiner

D. E. TALBERT, Jr., Assistant Examiner

U.S. Cl. X.R.

55—135; 261—75